United States Patent
Hermanns

(10) Patent No.: US 6,330,115 B1
(45) Date of Patent: Dec. 11, 2001

(54) MICROSCOPE EYEPIECE WITH 10× MAGNIFICATION

(75) Inventor: Klaus Hermanns, Asslar (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/529,078

(22) PCT Filed: Sep. 7, 1998

(86) PCT No.: PCT/DE98/02640

§ 371 Date: Apr. 7, 2000

§ 102(e) Date: Apr. 7, 2000

(87) PCT Pub. No.: WO99/22264

PCT Pub. Date: May 6, 1999

(30) Foreign Application Priority Data

Oct. 24, 1997  (DE) ............................................. 197 46 925

(51) Int. Cl.⁷ ............................. G02B 3/00; G02B 25/00; G02B 9/00
(52) U.S. Cl. ....................... 359/643; 359/646; 359/644; 359/645; 359/642; 359/754
(58) Field of Search .................. 359/642–648, 359/754, 756

(56) References Cited

U.S. PATENT DOCUMENTS

| | | | |
|---|---|---|---|
| 3,807,835 | 4/1974 | Sussman | 350/220 |
| 3,867,018 | * 2/1975 | Shoemaker | 359/643 |
| 4,200,357 | 4/1980 | Itaya | 350/175 E |
| 5,255,121 | 10/1993 | Suzuki | 359/643 |

FOREIGN PATENT DOCUMENTS 2 337 650   3/1974   (DE).
39 25 246   4/1990   (DE).

OTHER PUBLICATIONS

W. Klein, "Aufbau und Korrektion der Mikroskopokulare," Jahrbuch Für Optikund Feinmechanik, 1977, XP002093430, pp. 95–127.

Patent Abstracts of Japan, vol. 096, No. 005, May 31, 1996, & JP 08 005937 A (Canon Inc), Jan. 12, 1996.

Patent Abstracts of Japan, vol. 006, No. 198 (P–147), Oct. 7, 1982, & JP 57 108822 A (Nippon Kogaku KK), Jul. 7, 1982.

Patent Abstracts of Japan, vol. 007, No. 125 (P–200), May 31, 1983, & JP 58 043418 A (Nihon Kougaku Kogyo KK), Mar. 14, 1983.

Patent Abstracts of Japan, vol. 095, No. 006, Jul. 31, 1995 & JP 07 063996 A (Nikon Corp), Mar. 10,1995.

* cited by examiner

Primary Examiner—Georgia Epps
Assistant Examiner—Michael A. Lucas
(74) Attorney, Agent, or Firm—Foley & Lardner

(57) ABSTRACT

The invention relates to a microscope eyepiece with theoretically reduced astigmatism in a compensating optical system. The inventive eyepiece has 10× magnification, a sight field (SFZ)$\leq 25$ and a Petzval sum (SP) of $0.014 \leq SP \leq 0.021$. Said eyepiece comprises a special field lens placed in front of a field stop and a negative lens in the eye lens section placed behind said field stop. The inventive field lens is embodied in the form of a simple, thick, positively diffracting meniscus which is convex in relation to the field stop and provided with the following field lens factor: $0.95 \leq beta' \leq 1.05$. The eye lens section can be displaced in relation to the field stop to enable diotropic adjustment. Special, advantageous embodiments of the field lens and examples of embodiments of the microscope eyepiece, complete with structural data, are described.

8 Claims, 2 Drawing Sheets

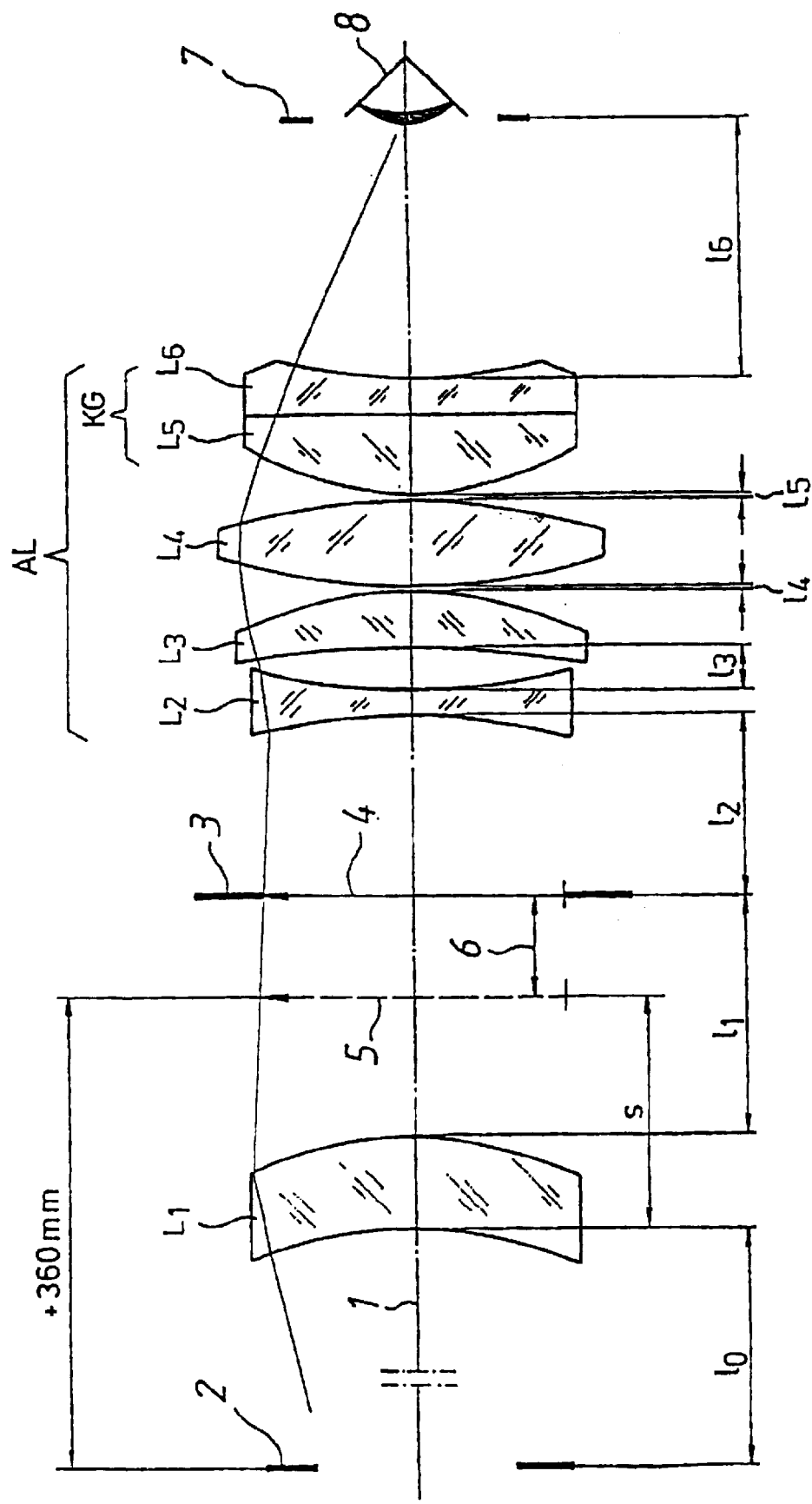

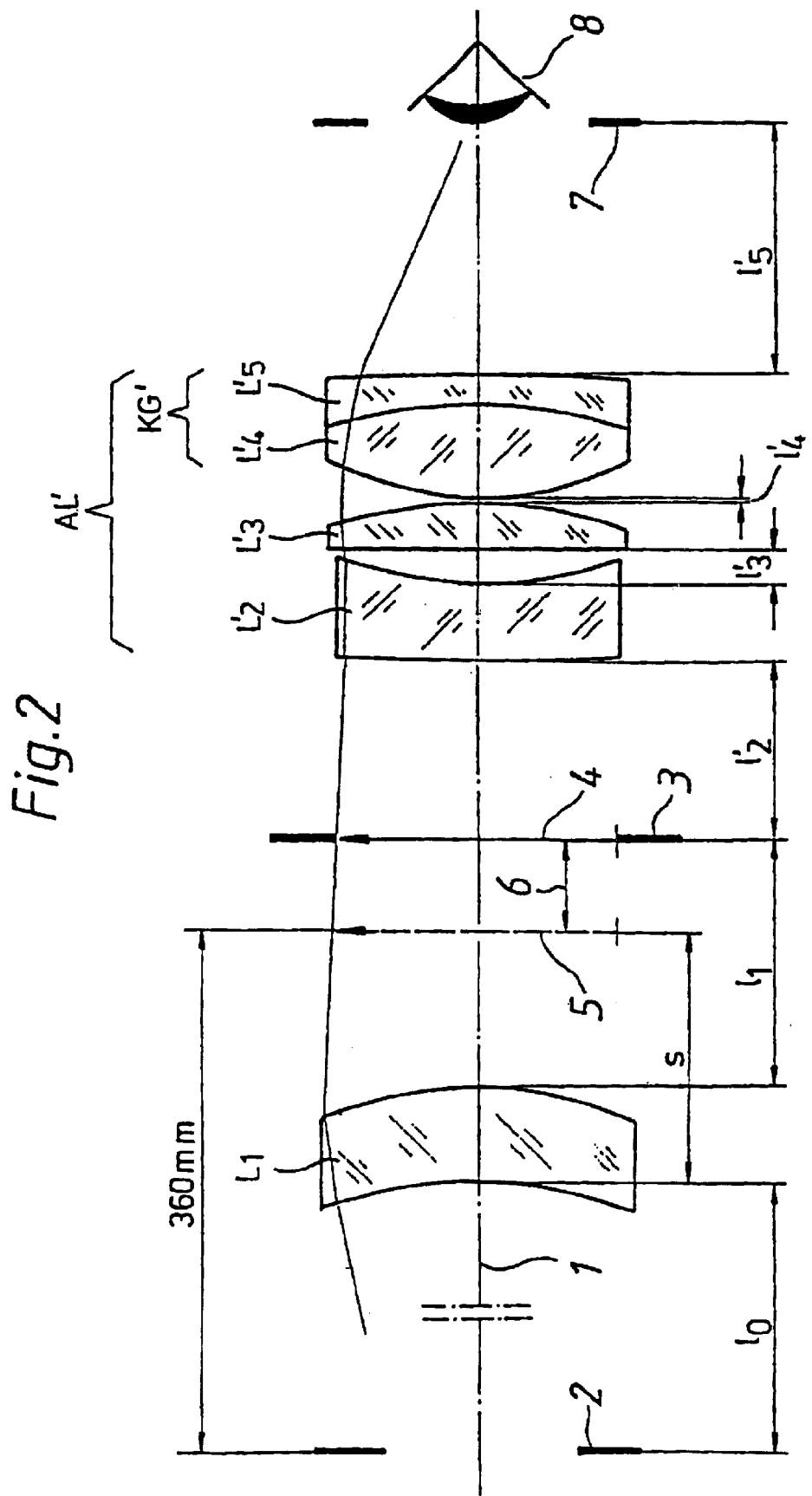

MICROSCOPE EYEPIECE WITH 10× MAGNIFICATION

FIELD OF THE INVENTION

The invention relates to a microscope eyepiece with 10× magnification according to the preamble of claim 1.

BACKGROUND OF THE INVENTION

Simple eyepieces for a microscope comprise a plurality of lenses or lens components with a positive refractive power. Some additionally contain a field lens with a positive refractive power, in order to favorably influence the imaging of the field stop or the diameter of the eye lens. The direction and curvature of the field curvature of an eyepiece are quantitatively described by its Petzval sum SP, where $$SP = f/n$$

(with f=focal length of the eyepiece; n=average refractive index).

In such an eyepiece, this sum is positive and large, so that in the case of corrected astigmatism the field curvature is also large.

To offer a viewer at the microscope a flattened image, the micro-objective must have a field curvature opposite to the field curvature of the eyepiece. For this purpose, it is known in the aberration correction of microscopes to work with a compensating model in which micro-objectives and eyepieces with matching astigmatism are combined. Such a compensating model is described in a paper by W. Klein in "Jahrbuch für Optik" [optical systems annual], year 1977, pages 95–127.

In this case, the astigmatism is not fully corrected in mutually assigned, so-called compensating micro-objectives and so-called compensating eyepieces, but is respectively set to a specific value. This respectively set value of the astigmatism is referred to hereafter as nominal astigmatism. A compensating micro-objective produces on the basis of its nominal astigmatism in the intermediate image a field curvature which is flattened by the assigned compensating eyepiece on the basis of its nominal astigmatism. For this purpose, the nominal astigmatism of the compensating eyepiece is set such that it is equal in magnitude and opposite in operational sign to the nominal astigmatism of the compensating micro-objective.

Although the invention relates to a compensating optical system, from here on the compensating eyepieces are referred to as eyepieces and the compensating micro-objectives are referred to as micro-objectives for the sake of simplicity.

Since the requirements for the micro-objectives—for example even better correction in the VIS/UV range of the spectrum with simultaneously high UV transparency, even better apochromatic correction, and even longer working distance, etc.—have constantly increased, it is becoming ever more difficult to implement such micro-objectives technically and commercially.

To implement such novel, highly corrected micro-objectives, their nominal astigmatism had to be fixed at half the previously customary value. Therefore, to retain the compensation, eyepieces with a halving of their nominal astigmatism and their nominal field curvature, corresponding to the oppositely equal value, are required for the new, halved nominal astigmatism of the novel micro-objectives.

Corresponding to the lower nominal astigmatism in comparison with the previous eyepieces, these eyepieces must be distinguished by a very small Petzval sum SP. The actual magnitude of the Petzval sum depends on the quality of the toleranced residual aberrations. For a highly corrected eyepiece with 10× magnification and a field of view number FVN=25, the Petzval sum SP is to be, for example, approximately 0.015 in order to provide the required new value of the nominal astigmatism. The aberrations are then closely toleranced in accordance with the highly corrected micro-objectives. In the case of an eye accommodated to infinity, the eye lens is set to 0 dioptrics. For this setting of the eye lens, the maximum transilluminated, so-called free lens diameter must not exceed 30 mm in order to ensure binocular viewing into the tube, even for small distance-between-eyes positions, on the basis of the outside dimensions of the eyepieces.

The prior art includes eyepieces with a small Petzval sum which are distinguished by a field lens and a strongly refractive negative lens in the so-called eye lens part, i.e. the lens group between the eye and the real intermediate image in the eyepiece. Such eyepieces are mentioned below and—after corresponding conversion—are examined for their possible use in the present compensating system.

For instance, U.S. Pat. No. 5,255,121 specifies such an eyepiece which has a Petzval sum greater than 0.015. It is disadvantageous, however, that coma, zonal astigmatism, pupil difference and distortions (>3%) are outside the desired range. It has two single lenses as the field lens part, with a field lens factor beta'=1.053. It requires a total of seven lenses, which make the eyepiece expensive. If the free lens diameter is scaled to the field of view number FVN=25, it is greater than 30 mm.

The eyepiece from U.S. Pat. No. 3,867,018 has six lenses, of which a thin, plano-convex lens is used as the field lens with a field lens factor beta'=0.767. At 0.007, the Petzval sum is too small for the desired compensating optical system. The coma and astigmatic distortion are also very great, as is the longitudinal chromatic aberration of the pupil. What is more, the free lens diameter, scaled to the field of view number FVN=25, is greater than 30 mm.

DE 39 25 246 C2 specifies in one embodiment an eyepiece with a cemented field lens component with a field lens factor beta'=1.047. It comprises only six lenses. What is disadvantageous is the poor image correction with strong coma, excessive pupil difference and a distortion of over 3%. The free lens diameter, scaled to a field of view number FVN=25, is significantly greater than 30 mm. What is more, the Petzval sum for this field of view number is greater than the desired value of 0.015.

JP 07063996 A describes an eyepiece in which the negative lens is arranged in the second position in the eye lens part. The negative lens is implemented as a lens component with a negative refractive power, optionally with or without a further added negative lens. The field lens is a lens component in the form of a meniscus which is convex with respect to the micro-objective. The field lens factor is equal to 0.996. The eyepiece is well corrected and the free lens diameter is less than 30 mm. However, its Petzval sum is equal to 0.019. What is more, it requires seven or eight lenses, which makes the eyepiece expensive.

Although the eyepieces mentioned mostly have a low Petzval sum, it is not appropriate for the specific requirements which the existing compensating system has to meet. What is more, they either have deficiencies in their imaging performance and/or are made with too many lenses. The free lens diameter is also too great in the case of most known eyepieces.

SUMMARY OF THE INVENTION

It is therefore the object of the present invention to specify an eyepiece with 10× magnification, which is suitable for use in a given compensating optical system. It is to be distinguished by a very good correction of all aberrations. The eyepiece is to be suitable for spectacle wearers, that is to say permit an appropriate dioptric adjustment. What is more, the transilluminated free lens diameters—with a setting of the eye lens to 0 dioptrics—must be at most 30 mm. Only then are the outside dimensions of the eyepieces small enough to allow them also to be set for close distances between eyes.

This object is achieved by the features specified in Patent Claim 1. Advantageous developments of the invention are the subject of the subclaims.

Specified is a microscope eyepiece with 10× magnification and a field of view number FVN≦25 in which there is arranged in front of a field stop in the direction of light a field lens with a field lens factor beta' of between 0.95 and 1.05 in the form of a simple thick meniscus, convex with respect to the field stop, with a positive refractive power. On the eye side, the field stop is followed by an eye lens part, which has as the first lens in the direction of light a negative lens and can be displaced in relation to the field stop for dioptric setting. In accordance with the given compensating system, the Petzval sum SP is between 0.014 and 0.021. It is set to the respectively required value with the negative lens of the eye lens part.

The aberrations of astigmatism, distortion and spherical aberration of the pupil are closely linked with one another in the eye lens part. For instance, a bending or refractive power distribution in the eye lens part has no great influence on the relationship of these aberrations to one another, i.e. all three aberrations cannot be corrected to the desired value at once.

In the field lens, which is situated on the other side of the field stop, the three aberrations have a different relationship to one another than in the eye lens part. Therefore, the accumulative aberration of astigmatism, distortion and pupil difference can be set to desired values by balancing out the elements of the aberrations between the field lens and the eye lens part.

In this aberration compensation, the bending of the field lens is particularly advantageous if, for the entrance back focus s of the field lens, a value of between 20 mm and 23 mm is prescribed and, for the distance of the entrance pupil of the eyepiece from the real intermediate image of the micro-objective, a value of between 250 mm and 700 mm is prescribed and if the Seidel sum SA for the astigmatism of the field lens lies between 0.0092 and 0.0104.

In an advantageous embodiment of the eyepiece according to the invention, the entrance back focus s of the field lens is prescribed as s=21.46 mm and the distance between the entrance pupil of the eyepiece and the real intermediate image of the micro-objective is prescribed as 360 mm. The Seidel sum SA for the astigmatism of the field lens is SA=0.0098.

The selection of the field lens factor beta' is of special significance. With a beta'<1, it follows for the focal length of the eye lens part that f'(AL)<25 mm. However, this gives a strained eye lens part, which is already too close to the eyepiece tube for the setting to 0 dioptrics. As a result, the required dioptrics adjustment is restricted on one side.

At beta'>1, the focal length of the eye lens part is greater. However, because of the magnified intermediate image, the cones of rays also pass through the eye lens part higher up and therefore undergo stronger, undesired aberrations.

Therefore, the most favorable value for the field lens factor is beta'≅1 with a deviation of ±5%. Making the field lens a thick meniscus, convex with respect to the eye lens part, has the effect of raising the image (i.e. the eye lens part moves further away from the eyepiece tube) and providing it with a suitable relationship for the three critical aberrations mentioned.

In some microscopic investigations, reticles are used in place of the field stop in order to provide the viewed image with a graduation. For this application, it proves to be particularly advantageous if the field lens factor is exactly beta'=1. As a result, the real intermediate image after the field lens is exactly the same size as the intermediate image that would be produced without a field lens. This provides the advantage that the same reticles can be used as in eyepieces without any field lens.

In an advantageous embodiment of the eyepiece, the amount of intermediate image displacement (=distance of the intermediate images with and without field lens) is greater than 4 mm. Then, a dioptric adjustment of up to ±6 dioptrics is possible by variation of the air clearance between the field stop and the eye lens part by about 4 mm.

The eyepiece according to the invention is well corrected and realizes very accurately the ideal tangential image surface required for the compensating system. It has no coma, a favorable pupil difference and only low distortion (below 3%).

The subclaims describe the configuration of the field lens according to the invention and two special configurations of the eyepiece according to the invention, with their structural data. The field lens proves to be universally usable in various eyepieces. It is even possible for it to be used in eyepieces other than for microscopy.

A special embodiment of the field lens is specified in Claim 5. It has on its front face, that is to say the light entering face, a first radius $r_1$=34.1960 mm and on its rear face, that is to say the light exiting face, a second radius $r_2$=31.1010 mm. The lens thickness $d_1$ of the meniscus described by these two radii $r_1$ and $r_2$ is $d_1$=7.3000 mm. The glass used is distinguished by a refractive index $n_{e1}$=1.812653 and an Abbe number $v_{e1}$=25.19.

BRIEF DESCRIPTION OF THE DRAWINGS

The two special configurations of the eyepiece specified in the subclaims are explained in more detail below with reference to two schematic drawings, in which:

FIG. 1 shows a sectional view of a lens of an eyepiece according to the invention with a field of view number FVN=25 according to Claim 7;

FIG. 2 shows a sectional view of a lens of an eyepiece according to the invention with a field of view number FVN=22 according to Claim 8.

DETAILED DESCRIPTION OF THE PREFERRED EMBODIMENTS

Represented in FIG. 1 as the first element in the direction of light along an optical axis 1 of an eyepiece with 10× magnification and with a field of view number FVN=25 is an entrance pupil 2. After an air clearance $l_0$, shortened in its representation, there follows a first lens $L_1$, which is designed as a field lens in the form of a thick meniscus of the thickness $d_1$. Its front face, with a radius $r_1$, and its rear face, with a radius $r_2$, are convex with respect to a field stop 3, which is arranged following at an air clearance $l_1$.

Lying in the plane of the field stop 3 is the intermediate image 4, which is produced by the field lens $L_1$. Represented for comparison is the intermediate image 5 of the micro-objective (not represented here) that would be produced without the field lens $L_1$. Likewise represented is the image displacement 6 between these two intermediate images 4, 5, which in this example is more than 4 mm.

The entrance back focus s of the field lens $L_1$ is s=21.46 mm, and the distance of the entrance pupil 2 of the eyepiece from the real, undisplaced intermediate image 5 of the micro-objective has a value of 360 mm. The Seidel sum SA for the astigmatism of the field lens $L_1$ is SA=0.0098. The field lens $L_1$ has a particularly advantageous field lens factor beta'=1, that is to say the undisplaced, real intermediate image 5 and the real intermediate image 4 displaced by the field lens $L_1$ are equal in size. As a result, the same reticles as in eyepieces without any field lens can be used in the plane of the field stop 3.

After the field stop 3 there follows at an air clearance $l_2$ a biconcave negative lens $L_2$ with a thickness $d_2$, a front radius $r_3$ and a rear radius $r_4$. Arranged thereafter at an air clearance $l_3$ is a concave-convex positive lens $L_3$ with a thickness $d_3$, the front concave face of which has a radius $r_5$ and the rear convex face of which has a radius $r_6$. After a small air clearance $l_4$ there follows a thick, biconvex positive lens $L_4$ of the thickness $d_4$, with a front radius $r_7$ and a rear radius $r_8$.

After a further small air clearance $l_5$ there follows a lens component KG with a positive refractive power, comprising the first transilluminated lens $L_5$ and a following cemented lens $L_6$. The lens $L_5$ has a thickness $d_5$, a front radius $r_9$ and a rear radius $r_{10}$. The rear radius $r_{10}$ is at the same time the front radius of the following cemented-on lens $L_6$ with a thickness $d_6$. The rear face of the latter, with a radius $r_{11}$, is concave with respect to the exit pupil 7, which lies at an air clearance 16 behind the lens component KG. Symbolically represented in the plane of the exit pupil 7 is a viewer's eye 8. The path of the marginal rays through the eyepiece is schematically represented. The required free diameter at the point of greatest cone cross section is less than 30 mm.

The lens group $L_2$, $L_3$, $L_4$ and the lens component KG, comprising the lenses $L_5$ and $L_6$, together form an eye lens part AL. The lens $L_2$ is in this case the necessarily powerful negative lens, which lowers the Petzval sum into the desired range.

The field lens $L_1$ converts the slightly divergent principal rays coming from the micro-objective into convergent rays, which the following negative lens $L_2$ of the eye lens part AL widens again, but not to the same extent as without field lens $L_1$. The following positive lenses $L_3$, $L_4$ and the lens component comprising $L_5$ and $L_6$ make the principal rays converge gradually in each case—and consequently with only minor aberrations. The lens component KG projects an image of the rays into the plane of the exit pupil 7, in which the viewer's eye 8 perceives it.

By balancing out the aberrations of the field lens L1 and of the eye lens part AL, the eyepiece according to the invention offers good image correction. Its Petzval sum SP is SP=0.015 and consequently, with a field of view number FVN=25, is ideal for the given compensating model. The fact that the air clearance $l_2$ between the field stop 3 and the eye lens part AL can be varied by up to 4 mm means that a dioptric adjustment of up to ±6 dioptrics is possible.

The exact structural data of the eyepiece are specified in tabular form in Claim 7. The field lens specified in Claim 5 is used as the field lens $L_1$.

Represented in FIG. 2 is an eyepiece with 10× magnification and a field of view number FVN=22. Up to the field stop 3, the structural design of the eyepiece is identical to that of the eyepiece (FVN=25) in FIG. 1. That is to say that, represented as the first element in the direction of light along the optical axis 1 is the entrance pupil 2 of the eyepiece. After the air clearance $l_0$, shortened in its representation, there follows the first lens $L_1$, which is already known from FIG. 1 and is designed in the form of a thick meniscus of the thickness $d_1$. Its front face, with the radius $r_1$, and its rear face, with the radius $r_2$, are convex with respect to the field stop 3, which is arranged following at an air clearance $l_1$.

Lying in the plane of the field stop 3 is the intermediate image 4, which is produced by the field lens $L_1$. Represented for comparison is the intermediate image 5 of the micro-objective (not represented here) that would be produced without the field lens $L_1$. The extent of the image displacement 6 between these two intermediate images 4, 5 is likewise represented and is more than 4 mm.

The entrance back focus s of the field lens $L_1$ is s=21.46 mm, and the distance of the entrance pupil 2 of the eyepiece from the real, undisplaced intermediate image 5 of the micro-objective has a value of 360 mm. The Seidel sum SA for the astigmatism of the field lens $L_1$ is SA=0.0098. The field lens $L_1$ has a particularly advantageous field lens factor beta'=1, that is to say the undisplaced, real intermediate image 5 and the real intermediate image 4 displaced by the field lens $L_1$ are equal in size. As a result, the same reticles as in eyepieces without any field lens can be used in the plane of the field stop 3.

After the field stop 3, the representation in FIG. 2 differs however from that in FIG. 1. After the field stop 3 there follows at an air clearance $l'_2$, as a powerful negative lens, a convex-concave lens $L'_2$ of the thickness $d'_2$, with a front radius $r'_3$ and a rear radius $r'_4$. Arranged close behind that there is a positive lens $L'_3$ with the thickness $d'_3$, the front face of which, with the radius $r'_5$, is a planar face and the rear face of which is convex, with a radius $r'_6$.

After a short air clearance $l'_4$ there follows a lens component KG' with a positive refractive power, comprising the first transilluminated lens $L'_4$ and the following lens $L_6$, cemented to it. Following the lens component KG' at an air clearance $l'_5$ is an exit pupil 7, in the plane of which the viewer's eye 8 is symbolically represented. The path of the marginal rays through the eyepiece is schematically represented. The required free diameter at the point of greatest cone cross section is less than 30 mm.

The front face of the lens $L'_4$, with a radius $r'_7$, is convex with respect to the field stop 3. Its rear, cemented face, with a radius $r'_8$, is convex with respect to the exit pupil 7. The first face of the lens $L'_5$, cemented to the lens $L'_4$, has the same radius $r'_8$ as the rear face of the lens $L'_4$. The rear face of the lens $L'_5$ is very flatly convex with respect to the exit pupil 7, with a radius $r'_9$.

The lens group $L'_2$, $L'_3$, and the lens component KG', comprising $L'_4$ and $L'_5$, together form an eye lens part AL'. The lens $L'_2$ is in this case the powerful negative lens, with which the Petzval sum of the eyepiece can be set to the desired value.

The field lens $L_1$ makes the slightly divergent principal rays coming from the micro-objective convergent again. The following negative lens $L'_2$ of the eye lens part AL' widens them again, but not to the same extent as without field lens $L_1$. The following positive lens $L'_3$ and the lens component KG' comprising the lenses $L'_4$ and $L'_5$ make the principal rays converge to a slight extent in each case, whereby only very minor aberrations occur. An image of the rays is projected by the lens component KG' into the plane of the exit pupil 7, in which the viewer's eye 8 perceives it.

The aberrations of the field lens $L_1$ and of the eye lens part AL' are balanced out in such a way that the eyepiece according to the invention has good image correction. Its Petzval sum SP is SP=0.021 and consequently—with a field of view number FVN=22—is ideal for the present compensating model. By varying the air clearance l'$_2$ between the field stop 3 and the eye lens part AL' by up to 4 mm, a dioptric adjustment of up to ±6 dioptrics is possible.

The exact structural data of the eyepiece described in this example are specified in tabular form in Claim 8. The field lens L$_1$ used corresponds to Claim 5.

The two exemplary embodiments make it clear that the same field lens can be used for eye lens parts of fundamentally different structural designs. How they are located in the path of rays and their basic design are therefore essential for the invention.

LIST OF DESIGNATIONS

1=optical axis or center ray
2=entrance pupil of the eyepiece
3=field stop
4=intermediate image displaced by the field lens L$_1$
5=intermediate image direct from the micro-objective, without field lens L$_1$
6=image displacement due to the field lens L$_1$
7=exit pupil
8=viewer's eye
s=entrance back focus of the field lens L$_1$
L$_1$=field length of the thickness d$_1$ with r$_1$/r$_2$=front/rear radius
L$_2$=negative lens of the thickness d$_2$ with r$_3$/r$_4$=front/rear radius
L$_3$=third lens of the thickness d$_3$ with r$_5$/r$_6$=front/rear radius
L$_4$=fourth lens of the thickness d$_4$ with r$_7$/r$_8$=front/rear radius
L$_5$=fifth lens of the thickness d$_5$ with r$_9$/r$_{10}$=front/rear radius
L$_6$=sixth lens of the thickness d$_6$ with r$_{10}$/r$_{11}$=front/rear radius
KG=lens component comprising L$_5$ and L$_6$
AL=eye lens part comprising L$_2$ to L$_6$
L$_1$'=field lens of the thickness d$_1$' with r$_1$'/r$_2$'=front/rear radius
L$_2$'=negative lens of the thickness d$_2$' with r$_3$'/r$_4$'=front/rear radius
L$_3$'=third lens of the thickness d$_3$' with r$_5$'/r$_6$'=front/rear radius
L$_4$'=fourth lens of the thickness d$_4$' with r$_7$'/r$_8$'=front/rear radius
L$_5$'=fifth lens of the thickness d$_5$' with r$_8$'/r$_9$'=front/rear radius
KG'=lens component comprising L'$_4$ and L'$_5$
AL'=eye lens part comprising L'$_2$ to L'$_5$

What is claimed is:

1. Microscope eyepiece with 10× magnification, a field of view number FVN≦25 and a field stop (3), in which there is provided in front of the field stop (3) in the direction of light a field lens (L$_1$) and behind the field stop (3) a negative lens (L$_2$, L$_2$'), as the first lens of an eye lens part (AL) which can be displaced in relation to the field stop (3) for dioptric setting, characterized in that
   a) the field lens (L$_1$) is designed in the form of a simple thick meniscus, convex with respect to the field stop (3), with a positive refractive power,
   b) the field lens (L$_1$) has a field lens factor beta' with 0.95≦beta'≦1.05 and
   c) the eyepiece has a Petzval sum SP with 0.014≦SP≦0.021.

2. Microscope eyepiece according to claim 1, characterized in that, with a given entrance back focus of 20≦s≦23 of the field lens (L$_1$) and a distance of 250 to 700 mm between the entrance pupil (2) of the eyepiece and a given real intermediate image (5) for the field lens, the Seidel sum for astigmatism SA lies between 0.0092 and 0.0104.

3. Microscope eyepiece according to claim 2, characterized in that, with an entrance back focus s of the field lens (L$_1$) of s=21.46 mm and a distance of 360 mm between the entrance pupil (2) of the eyepiece and the given real intermediate image (5) for the field lens (L$_1$) the Seidel sum for astigmatism is SA=0.0098.

4. Microscope eyepiece according to claim 1, characterized in that the field lens factor is beta'=1.

5. Microscope eyepiece according to claim 1, characterized in that the field lens (L$_1$) has the following structural parameters:

| Radius r$_1$ (mm) | Radius r$_2$ (mm) | Lens thickness d | Refractive index n$_e$ | Abbe number v$_e$ |
|---|---|---|---|---|
| r$_1$ = −34.1960 | r$_2$ = −31.1010 | d$_1$ = 7.3000 | n$_{e1}$ = 1.812653 | v$_{e1}$ = 25.19 | where r$_1$=radius of the front face (=light entering face);
r$_2$=radius of the rear face (=light exiting face).

6. Microscope eyepiece according to claim 1, characterized in that the field lens (L$_1$) produces an image displacement (6) of the given, real intermediate image (5) of more than 4 mm and the field stop (3) is arranged in the plane of the displaced intermediate image (4).

7. Microscope eyepiece according claim 1 with a field of view number FVN=25, characterized by the following structural data:

| Radius r (mm) | Air clearance 1 (mm) | Lens thickness d (mm) | Refractive index n$_e$ | Abbe number v$_e$ |
|---|---|---|---|---|
| Entrance pupil | | | | |
| | l$_0$ = 338.5400 | | | |
| r$_1$ = −34.1960 | | d$_1$ = 7.3000 | n$_{e1}$ = 1.812653 | v$_{e1}$ = 25.19 |
| r$_2$ = −31.1010 | | | | |
| | l$_1$ = 19.5000 | | | |
| Field stop | | | | |
| | l$_2$ = 14.3364 | | | |
| r$_3$ = −50.6810 | | d$_2$ = 2.0000 | n$_{e2}$ = 1.812653 | v$_{e2}$ = 25.19 |
| r$_4$ = 50.6810 | | | | |
| | l$_3$ = 3.3400 | | | |
| r$_5$ = −87.8770 | | d$_3$ = 4.6600 | n$_{e3}$ = 1.808207 | v$_{e3}$ = 46.16 |
| r$_6$ = −31.4830 | | | | |
| | l$_4$ = 0.2000 | | | |
| r$_7$ = 51.4910 | | d$_4$ = 7.0000 | n$_{e4}$ = 1.776855 | v$_{e4}$ = 49.33 |
| r$_8$ = −51.4910 | | | | |
| | l$_5$ = 0.2000 | | | |

-continued

| Radius r (mm) | Air clearance l (mm) | Lens thickness d (mm) | Refractive index $n_e$ | Abbe number $\nu_e$ |
|---|---|---|---|---|
| $r_9 = 24.1070$ | | $d_5 = 6.6000$ | $n_{e5} = 1.622872$ | $\nu_{e5} = 59.89$ |
| $r_{10} = -557.6800$ | | $d_6 = 2.8000$ | $n_{e6} = 1.812653$ | $\nu_{e6} = 25.19$ |
| $r_{11} = 42.8390$ | | | | |
| | $l_6 = 20.6265$ | | | |
| Exit pupil. | | | | |

8. Microscope eyepiece according to claim 1 with a field of view number FVN=22, characterized by the following structural data:

| Radius r (mm) | Air clearance l (mm) | Lens thickness d (mm) | Refractive index $n_e$ | Abbe number $\nu_e$ |
|---|---|---|---|---|
| Entrance pupil | | | | |
| | $l_0 = 338.5400$ | | | |
| $r_1 = -34.1960$ | | $d_1 = 7.3000$ | $n_{e1} = 1.812653$ | $\nu_{e1} = 25.19$ |
| $r_2 = -31.1010$ | | | | |
| Field stop | $l_1 = 19.5000$ | | | |
| | $l'_2 = 14.2931$ | | | |
| $r'_3 = 360.7850$ | | $d'_2 = 6.0000$ | $n'_{e2} = 1.812653$ | $\nu'_{e2} = 25.19$ |
| $r'_4 = 30.1760$ | | | | |
| | $l'_3 = 2.7000$ | | | |
| $r'_5 =$ planar face | | $d'_3 = 3.7000$ | $n'_{e3} = 1.808207$ | $\nu'_{e3} = 46.16$ |
| $r'_6 = -34.5320$ | | | | |
| | $l'_4 = 0.2500$ | | | |
| $r'_7 = 24.1070$ | | $d'_4 = 7.4000$ | $n'_{e4} = 1.776855$ | $\nu'_{e4} = 49.33$ |
| $r'_8 = -36.7630$ | | $d'_5 = 2.3000$ | $n'_{e5} = 1.812653$ | $\nu'_{e5} = 25.19$ |
| $r'_9 = -197.2040$ | | | | |
| | $l'_5 = 21.3813$ | | | |
| Exit pupil. | | | | |

* * * * *